Nov. 9, 1954 G. H. BAKER 2,694,196
DUPLEX RADIO TELEPHONE SYSTEM
Filed Dec. 28, 1951
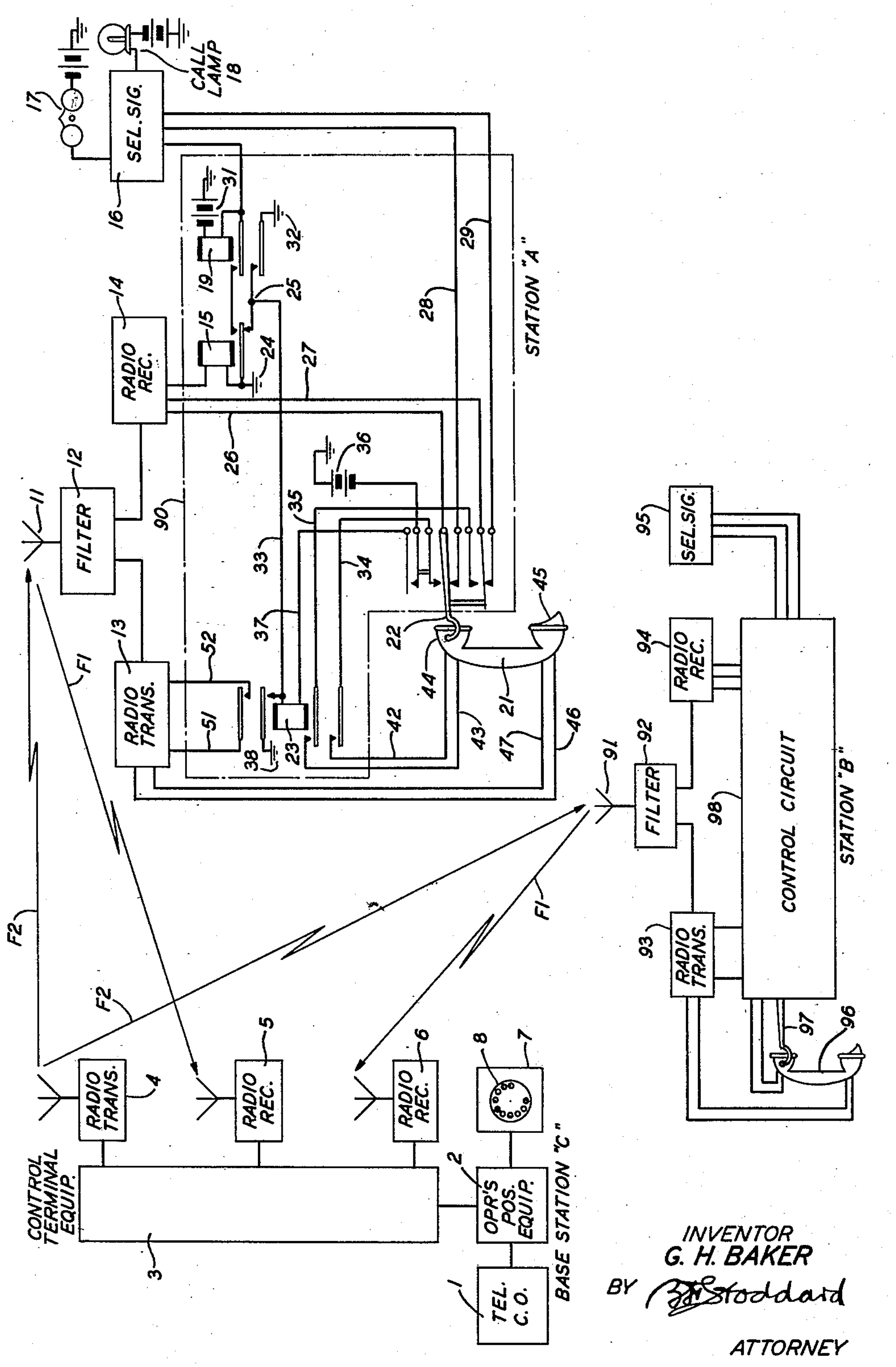
INVENTOR
G. H. BAKER
BY [signature]
ATTORNEY United States Patent Office 2,694,196

Patented Nov. 9, 1954

2,694,196

DUPLEX RADIO TELEPHONE SYSTEM

George H. Baker, Orange, N. J., assignor to Bell Telephone Laboratories, Incorporated, New York, N. Y., a corporation of New York Application December 28, 1951, Serial No. 263,720

8 Claims. (Cl. 343—177)

This invention relates to radio telephone communication systems and, more particularly, to a single channel full duplex radio telephone communication system. The invention may be used with advantage in radio telephone systems having certain of their stations carried on passenger vehicles. Certain features of the invention are not limited to use in a single channel system nor to use in a full duplex system, but may be used in multichannel systems, simplex systems, and half-duplex systems.

In a single channel full duplex radio telephone system having a control station serving a plurality of customer's radio stations, it is desirable for obvious reasons to employ privacy means for preventing any of the customers from listening to communications between other customers. It is also desirable to employ lock-out means for preventing a customer from initiating a call during periods when another customer is using the single channel.

Accordingly, it is an object of this invention to provide improved means for obtaining full duplex operation of a single channel radio telephone communication system.

Another object of the invention is to provide improved means for obtaining privacy of communication in a radio telephone system having a single radiant energy channel for serving a plurality of customer's stations.

A further object of the invention is to provide improved means for preventing a customer in a multistation single channel radio telephone system from radiating carrier energy from his station during periods when another customer is employing the channel for communication purposes.

These and other objects of the invention are accomplished in a manner that is fully explained hereinafter in connection with the following detailed description of the drawing which represents a full duplex single channel radio telephone system having a control station and a plurality of customer's stations.

The radio communication system shown in the drawing comprises a control radio telephone station C and a plurality of customers' radio telephone stations A and B. It is to be understood that the system may include more than two customers' stations and that one or more of them may be carried on passenger vehicles. The control, or base, station C is similar to that disclosed by A. C. Peterson in an article entitled "Vehicle Radio Telephony Becomes a Bell System Practice" and published in volume 25 of the "Bell Laboratories Record" on pages 137 to 141, inclusive. The control station C is shown in the drawing to include a conventional telephone central office 1 which is connected to the usual operator's switchboard position equipment 2 which in turn is connected to standard control terminal equipment 3. The terminal equipment 3 is also connected to a conventional radio transmitter 4 and to conventional radio receivers 5 and 6. The number of radio receivers employed is not critical; only one need be used but, if desired, three or more may be used to obtain the benefits of space diversity reception. In order to transmit selective calling signals to the various customers' stations the operator's position equipment 2 has connected thereto conventional selective calling equipment 7 having a dial 8. This selective calling equipment 7 may be of any suitable design, such as that disclosed by C. N. Anderson and H. M. Pruden in an article entitled "Radiotelephone System for Harbor and Coastal Services" and published on pages 245 to 253, inclusive, of the "Proceedings of the Institute of Radio Engineers" volume 27, 1939.

Although the function of the control terminal equipment 3 is well known in the art, it may be mentioned that it serves to connect the talking circuit from the telephone central office 1 to the radio transmitter 4 and radio receivers 5 and 6. It also functions to enable the operator's position equipment 2 to control the operation of the radio transmitter 4 and to apply to the transmitter 4 selective calling signals from the selective calling equipment 7. In addition, the terminal equipment 3 selects that one of the radio receivers 5 and 6 having the better quality of reception.

The customer's station A is provided with a single antenna 11 for both receiving and transmitting carrier waves. The antenna 11 is coupled through a filter 12 to a radio transmitter 13 and a radio receiver 14. The receiver 14 includes a conventional codan control circuit of any suitable design, such as that disclosed on page 653 of F. E. Terman's "Radio Engineers' Handbook," for controlling the energization of a codan relay 15. As is well known to those skilled in the art, the codan control circuit is designed to cause the normally unenergized codan relay 15 to become energized in response to the reception by the receiver 14 of carrier energy. The output from the receiver 14 is coupled to selective signal receiving equipment 16 of any suitable design, such as that described by B. P. Cottrell in an article entitled "Selective Calling for Mobile Telephone Services" and published on pages 32 to 34, inclusive, of "FM and Television," issue of January 1948. When the particular selective calling signal assigned to station A is received, the equipment 16 functions to effect the ringing of a call bell 17, the lighting of a call lamp 18, and the energization of a call relay 19. The station A is also equipped with a signal reproduced in the form of a telephone instrument 21, and a holder 22 for holding the telephone instrument 21 during idle periods. Although the holder 22 is represented in the drawing as being in the form of a hook switch, any other suitable type of control switch-holder may be used if desired. A start relay 23 is provided for performing various control functions that are described hereinafter.

The other customer's station B is equipped in a manner similar to station A, and is represented in the drawing in block schematic form for the purpose of simplicity. It comprises a single antenna 91 coupled through a filter 92 to a radio transmitter 93 and a radio receiver 94. Also, it is provided with selective signal receiving equipment 95 and a telephone instrument 96 which is held during idle periods by a holder 97. The elements 93 to 97, inclusive, are connected to a control circuit represented by the block 98. This control circuit includes equipment similar to that enclosed within the broken line 90 at station A and performs the same functions.

The radiant energy signaling channel assigned to the system comprises two frequency allocations. One frequency allocation, F1, is employed for the transmission of carrier waves from the customers' stations A and B to the control station C. Accordingly, the customers' radio transmitters 13 and 93 are each designed to produce carrier waves having a mean frequency of F1, and the radio receivers 5 and 6 at the control station C are tuned to receive these carrier waves. Similarly, the other frequency allocation, F2, is employed for the transmission of carrier waves from the control station C to the customers' stations A and B. Therefore, the radio transmitter 4 at the control station C is designed to produce carrier waves having a mean frequency of F2 and the radio receivers 14 and 94 at the customers' stations A and B are tuned to receive these carrier waves. These carrier waves of mean frequencies F1 and F2 are not radiated during idle periods but only when signaling is taking place. It may be mentioned at this point that the filters 12 and 92 at the customers' stations A and B are designed to have sufficient frequency discrimination to prevent their associated transmitters 13—93 from overloading the inputs of their associated receivers 14—94, respectively.

In originating a call from the control station C to any one of the customers' stations, such as the station A, the operator at station C starts the radio transmitter 4 in a conventional manner, such as is described in the above-mentioned article by A. C. Peterson, and causes it to radiate its carrier. Reception of this carrier energy at each of the customers' stations will effect the energization of their respective codan relays 15. Consequently, each codan relay 15 will operate its armature to connect ground 24 to a contact of its associated call relay 19. The operator next rotates the dial 8 of the selective signaling equipment 7 to apply to the transmitter 4 the particular selective calling signal which is assigned to station A. Accordingly, the carrier waves radiated by the transmitter 4 will now be modulated with this selective calling signal.

These modulated carrier waves will be received at each of the customers' stations but, as this particular calling signal is assigned to only the station A, only the selective signal receiving equipment 16 at station A will be operated by this calling signal. The path for operating the equipment 16 extends from the receiver 14 along conductors 26 and 27, over contacts of the hook switch 22, and then along conductors 28 and 29 to the equipment 16. Operation of the equipment 16 effects the ringing of the call bell 17 and the lighting of the call lamp 18, thereby providing the customer at station A with both audible and visible warning indications that he is being called. It also effects the energization of the call relay 19 which operates its armatures. Relay 19 now locks-up over a path extending from battery 31, operated inner armature of relay 19, and then over the operated armature of relay 15 to ground 24. Thus, the call relay 19 will remain energized as long as the received carrier energy holds the codan relay 15 energized. The operation of the outer armature of relay 19 functions as a calling switch to connect ground 32 to conductor 33 which extends to the winding of the start relay 23.

In the event the customer does not answer the call, as would be the case if he were absent from station A, the operator at station C will abandon the call and will stop the operation of her radio transmitter 4. Since the codan control circuit in the receiver 14 at station A will now not receive any carrier energy, it will effect the deenergization of the codan relay 15. Relay 15 will now release its armature to open the locking circuit of the call relay 19. This causes relay 19 to release its armatures thereby disconnecting ground 32 from the energizing circuit of the start relay 23. This restores the system to its normal idle condition.

If the customer is at the station A and wishes to answer the call, he does so by removing the telephone 21 from its holder 22. This releases the springs of the hook switch 22 which now engage their upper contacts. The movement of the two lower springs disconnects the radio receiver's audio output circuit comprising conductors 26 and 27 from conductors 28 and 29, respectively, and connects them instead to conductors 34 and 35, respectively, which lead to the lower armatures of the start relay 23. At the same time, the top hook switch spring connects battery 36 to the winding of the start relay 23 by way of conductor 37. Accordingly, current will now flow from battery 36, along conductor 37, through the winding of relay 23, along conductor 33, and then over the operated outer armature of the call relay 31 to ground 32. This energizes the start relay 23 which thereupon operates its armatures and locks-up over its inner upper armature to ground. This locking circuit remains closed until the telephone instrument 21 is replaced upon its holder 22. The operation of the two lower armatures connects conductors 34 and 35 to conductors 42 and 43, respectively, thereby coupling the receiver 44 of the telephone instrument 21 to the output of the radio receiver 14.

It should be noted that, although the transmitter 45 of the telephone instrument 21 is connected at all times to the audio input circuit of the radio transmitter 13 by conductors 46 and 47, the radio transmitter 13 is normally unenergized due to its conventional power control circuit, which extends along conductors 51 and 52, being open at the outer upper armature and contact of the start relay 23. However, due to the energization of the start relay 23, its outer upper armature becomes operated thus closing the power control circuit of the radio transmitter 13 and starting its operation in a manner well known to those skilled in the art. The resulting carrier waves now generated by the radio transmitter 13 are radiated by the antenna 11 and are received by one or more of the radio receivers 5 and 6 at the control station C. This completes the conditioning of the radiant energy signaling system for communication purposes, and communication may now take place on a full duplex basis.

At the completion of the call, the customer at station A replaces his telephone 21 upon its holder 22 thereby forcing the springs of the hook switch 22 to move down away from their upper contacts and into engagement with their lower contacts. This movement of the two lower springs disconnects the telephone receiver 44 from the radio receiver 14 and connects the output leads 26 and 27 from the radio receiver 14 to conductors 28 and 29, respectively, which are the input supply leads to the selective receiving equipment 16. At the same time, the actuation of the top spring of the hook switch 22 disconnects battery 36 from the locking circuit of the start relay 23 which consequently releases its armatures. The release of the two lower armatures of relay 23 disconnects conductors 34 and 35 from the telephone receiver conductors 42 and 43, respectively. The release of the top armature of relay 23 disconnects conductor 51 from conductor 52 thereby opening the power control circuit of the radio transmitter 13 which accordingly discontinues the generation of carrier energy.

Meanwhile, the operator at the control station C has discontinued the operation of her radio transmitter 4 in a manner well known to those skilled in the art. Since no carrier energy having a mean frequency F2 will now be received by the antenna 11 at station A, the conventional codan control circuit in the radio receiver 14 will now effect the deenergization of the codan relay 15. Relay 15 now releases its armature to remove ground 24 from the locking circuit of the call relay 19 which thereupon releases its armatures. The release of its inner armature opens another portion of its locking circuit, and the release of its outer armature disconnects ground 32 from conductor 33 which extends from the winding of the start relay 23. This completes the restoration of the system to its normal idle condition.

In originating a call from any one of the customers' stations, such as the station A, to the control station C, the customer at station A first removes his telephone instrument 21 from its holder 22 thereby permitting the springs of the hook switch 22 to move to their upper contacts. The engagement of the top spring with its upper contact closes a circuit from battery 36, along conductor 37, winding of the start relay 23, and then along conductor 33 to the junction point 25. Since the customer has not been called, his call relay 19 will not be energized; consequently, ground 32 will not be connected to the junction point 25. If the operator at the control station C is communicating with a customer at another station in this system at this time, then her carrier will be received by the radio receiver 14 with the result that the codan relay 15 will be energized and its operated armature will function as a busy switch to disconnect ground 24 from the junction point 25.

Thus, when the system is in a busy condition, the junction point 25 will not be grounded and, therefore, the start relay 23 cannot be energized. This prevents the customer at station A from starting his radio transmitter 13 as this would interfere with the other call. Furthermore, since the two lower armatures of the start relay 23 are not operated, the telephone receiver 44 cannot be connected to the radio receiver 14. This prevents the customer at station A from listening in to messages directed to a customer at another station and thereby insures privacy of communication.

If the channel is idle, no carrier energy will be received and the codan relay 15 will not be energized. Accordingly, its unoperated armature will connect ground 24 to the junction point 25 thereby completing the circuit for current from battery 36 to energize the start relay 23 which operates its armatures. The operation of its two lower armatures completes the coupling of the telephone receiver 44 to the radio receiver 14 as was described above. The operation of its inner upper armature closes the locking circuit for relay 23. The operation of its outer upper armature closes the above-mentioned power control circuit of the radio transmitter 13 which starts to radiate its carrier. This carrier will be received by one or more of the radio receivers 5 and 6 at the control station C and will effect the lighting of a call lamp at the operator's position equipment 2 in a manner well known in the art. The operator at station C answers the call by starting her radio transmitter 4 and the system is thus placed in condition for the call to proceed on a full duplex basis. Termination of the call is effected in the same manner as that described above.

This particular embodiment of the invention has been described in order to explain the principles and features of operation of the invention. It is to be understood that the invention is not limited to the specific circuit construction shown in the drawing as various modifications may be made without exceeding the scope of the invention which is to be limited only by the claims appended hereto.

What is claimed is:

1. In a radio communication system having radiating means for radiating carrier current and calling means for transmitting selective calling signals, a radio transmitting and receiving station including a radio transmitter and a radio receiver, a normally open power control circuit extending from said transmitter, a signal reproducer, an output circuit extending from said receiver and connectable to said signal reproducer, an electroresponsive instrumentality for simultaneously closing said power supply circuit and for connecting the receiver output circuit to the reproducer, an energizing circuit for operating said instrumentality, disabling means responsive to the reception of carrier current by said receiver for opening said energizing circuit to preclude operation of said instrumentality, and enabling means responsive to the reception by the receiver of a preassigned selective calling signal for restoring said energizing circuit to a condition for enabling operation of said electroresponsive instrumentality.

2. In a radio communication system having radiating means for radiating carrier current and calling means for transmitting selective calling signals, a radio transmitting and receiving station including a radio transmitter and a radio receiver, a normally open power control circuit extending from said transmitter, a signal reproducer, an output circuit extending from said receiver and connectable to said signal reproducer, an electroresponsive instrumentality for simultaneously closing said power supply circuit and for connecting the receiver output circuit to the reproducer, a normally open energizing circuit connected to said instrumentality and having two parallel paths, one of said paths being normally closed and the other being normally open, a control switch responsive to a manual operation for closing said energizing circuit to effect the operation of said instrumentality, disabling means responsive to the reception of carrier current by said receiver for opening said normally closed path for precluding closure of said energizing circuit by said control switch, and enabling means responsive to the reception by the receiver of a preassigned selective calling signal for closing said normally open path for conditioning said energizing circuit for closure by said control switch.

3. A radio communication system in accordance with claim 2 and having locking means for holding said instrumentality operated for as long a period of time as said energizing circuit is closed by said control switch regardless of subsequent operations of said disabling means and said enabling means.

4. In a duplex radio communication system having radiating means for radiating carrier current and calling means for transmitting selective calling signals, a radio transmitting and receiving station including a radio transmitter and a radio receiver, a normally open power control circuit extending from said transmitter, a signal reproducer, an output circuit extending from said receiver and connectable to said signal reproducer, an electroresponsive instrumentality for simultaneously closing said power supply circuit and for connecting the receiver output circuit to the reproducer, a normally open energizing circuit connected to said instrumentality, a control switch responsive to a manual operation for closing said energizing circuit to effect the operation of said instrumentality, disabling means responsive to the reception of carrier current by said receiver for additionally opening said normally open energizing circuit for precluding closure thereof by said control switch, and enabling means responsive to the reception by the receiver of a preassigned selective calling signal for nullifying the effect of the operation of said disabling means and for conditioning said energizing circuit for closure by said control switch.

5. In a radio communication system having radiating means for radiating carrier current and calling means for transmitting selective calling signals, a radio transmitting and receiving station including a radio transmitter and a radio receiver, a normally open power control circuit extending from said transmitter, a signal reproducer, an output circuit extending from said receiver and connectable to said signal reproducer, an instrumentality for simultaneously closing said power supply circuit and for connecting the receiver output circuit to the reproducer, operating means for effecting the operation of said instrumentality, disabling means responsive to the reception of carrier current by said receiver for rendering said operating means ineffectual thereby preventing the operation of said instrumentality, and enabling means responsive to the reception by the receiver of a preassigned selective calling signal for nullifying the effect of the operation of said disabling means and for rendering said operating means effectual for effecting the operation of said instrumentality.

6. In a radio communication system having radiating means for radiating carrier current and calling means for transmitting selective calling signals, a radio transmitting and receiving station including a radio transmitter and a radio receiver, a normally open power control circuit extending from said transmitter, a signal reproducer, an output circuit extending from said receiver and connectable to said signal reproducer, an electroresponsive instrumentality for simultaneously closing said power supply circuit and for connecting the receiver output circuit to the reproducer, a normally open energizing circuit connected to said instrumentality and having three parallel paths, one of said paths being normally closed and the other two paths being normally open, a control switch responsive to a manual operation for closing said energizing circuit to effect the operation of said instrumentality, disabling means responsive to the reception of carrier current by said receiver for opening said normally closed path for precluding closure of said energizing circuit by said control switch, enabling means responsive to the reception by the receiver of a preassigned selective calling signal for closing one of said normally open paths for conditioning said energizing circuit for closure by said control switch, and holding means responsive to the operation of said instrumentality for closing the other of said normally open paths for holding said instrumentality operated.

7. In a duplex radio communication system having radiating means for radiating carrier current and calling means for transmitting selective calling signals, a radio transmitting and receiving station comprising a radio transmitter, a normally open power control circuit extending from said transmitter for controlling the application of power for operating said transmitter, a radio receiver, a signal reproducer, a normally open output circuit extending from said receiver and connectable to said signal reproducer for delivering output energy from the receiver to the reproducer for reproduction thereof, an instrumentality for closing the power control circuit and at the same time closing the receiver output circuit to said reproducer, operating means for effecting the operation of said instrumentality, disabling means responsive to the reception of carrier current by said receiver for rendering said operating means ineffectual to effect the operation of said instrumentality, and enabling means responsive to the reception by said receiver of a preassigned selective calling signal for nullifying the effect of said disabling means and for rendering said operating means effectual for effecting the operation of said instrumentality.

8. In a duplex radio communication system having transmitting means for transmitting carrier current and calling means for transmitting selective calling signals, a radio transmitting and receiving station comprising a radio transmitter, a radio receiver, a telephone instrument, an audio circuit for delivering the audio output of the receiver to the telephone instrument, a control switch connected in said audio circuit for holding said instrument and normally held open by said instrument, a power control circuit for controlling the application of power for operating the transmitter, a normally closed busy switch, operating means for opening said busy switch in response to the reception of carrier current by said receiver, a normally open calling switch, selective operating means for closing said calling switch in response to the reception by the receiver of a preassigned selective calling signal, said station being characterized by having lock-out and privacy means including a control relay provided with a plurality of armatures, one of said armatures being connected in said power control circuit and another of said armatures being connected in said audio circuit, a battery, means responsive to the removal of the telephone instrument from the control switch for applying current from said battery to energize said relay through a path including said normally closed busy switch, selective means for energizing said relay during periods when said busy switch has been opened by said operating means, said selective means including said normally open calling switch, and holding means including an armature and contact of said relay for holding said relay energized after current from the battery has been applied thereto and until the handset is replaced on said control switch.

References Cited in the file of this patent

UNITED STATES PATENTS

| Number | Name | Date |
|---|---|---|
| 2,061,699 | Fox | Nov. 24, 1936 |
| 2,165,062 | MacKay | July 4, 1939 |
| 2,387,146 | Haberl | Oct. 16, 1945 |
| 2,501,091 | Preston et al. | Mar. 21, 1950 |
| 2,571,031 | Hansell | Oct. 9, 1951 |
| 2,626,319 | Cheek | Jan. 20, 1953 |